United States Patent
Salice et al.

(10) Patent No.: US 9,359,146 B2
(45) Date of Patent: Jun. 7, 2016

(54) MONITORING SYSTEM FOR TRANSPORT CHAINS FOR CONVEYORS OF ARTICLES

(75) Inventors: Fabio Salice, Cantu (IT); Carlo Moroni, Vimercate (IT); Roberto Mariani, Gorgonzola (IT); Roberto Galli, Olgiate Comasco (IT)

(73) Assignee: REXNORD FLATTOP EUROPE S.R.L., Correggio (RE) (IT)

( * ) Notice: Subject to any disclaimer, the term of this patent is extended or adjusted under 35 U.S.C. 154(b) by 306 days.

(21) Appl. No.: 14/238,328

(22) PCT Filed: Aug. 10, 2012

(86) PCT No.: PCT/EP2012/065761
§ 371 (c)(1),
(2), (4) Date: Apr. 28, 2014

(87) PCT Pub. No.: WO2013/024057
PCT Pub. Date: Feb. 21, 2013

(65) Prior Publication Data
US 2014/0236348 A1    Aug. 21, 2014

(30) Foreign Application Priority Data
Aug. 12, 2011   (IT) .............................. MI2011A1537

(51) Int. Cl.
| | | |
|---|---|---|
| *G06F 7/00* | (2006.01) | |
| *B65G 43/00* | (2006.01) | |
| *B65G 43/02* | (2006.01) | |

(52) U.S. Cl.
CPC ................ *B65G 43/00* (2013.01); *B65G 43/02* (2013.01); *B65G 2203/043* (2013.01)

(58) Field of Classification Search
USPC ......................................................... 700/230
See application file for complete search history.

(56) References Cited

U.S. PATENT DOCUMENTS

| 2006/0219528 A1* | 10/2006 | Aizawa | ................ | B65G 43/02 198/810.03 |
| 2009/0145730 A1* | 6/2009 | Aizawa | ................ | B65G 43/02 198/810.02 |

(Continued)

FOREIGN PATENT DOCUMENTS

| CN | 1609444 A | 4/2005 |
| CN | 101160250 A | 4/2008 |

(Continued)

OTHER PUBLICATIONS

The International Search Report as mailed on Sep. 28, 2012 for International Application No. PCT/EP2012/065761.

(Continued)

*Primary Examiner* — Kyle Logan
(74) *Attorney, Agent, or Firm* — Quarles & Brady LLP

(57) ABSTRACT

Monitoring system for a conveyor of articles (100). The conveyor of articles comprises at least one transport chain (105) adapted to be moved along a movement direction, and a guide structure (132) of the transport chain comprising a lower guide element (135) adapted to support the chain from below and a higher guide element (140) adapted to insist on the chain from above and facing toward the lower guide element. The system comprises at least one first magnetic field generator element (155) located in a first guide element, at least one magnetic field sensor (160) located in a second selected guide element for sensing the magnitude of a measure magnetic field, and processing means (165) for quantifying a reduction of the overall thickness of the chain based on a time variation of the measure magnetic field.

11 Claims, 8 Drawing Sheets

(56) References Cited

U.S. PATENT DOCUMENTS

| | | | | |
|---|---|---|---|---|
| 2011/0050213 A1* | 3/2011 | Furukawa | .............. | B65G 43/02 324/228 |
| 2012/0168281 A1* | 7/2012 | Twigger | ................ | B65G 43/06 198/502.1 |
| 2012/0306481 A1* | 12/2012 | Nakamura | ............. | B65G 43/02 324/228 |

FOREIGN PATENT DOCUMENTS

| | | |
|---|---|---|
| CN | 101277882 A | 10/2008 |
| CN | 101910027 A | 12/2010 |
| EP | 1 873 088 A1 | 1/2008 |
| JP | 2006258478 A | 9/2006 |
| WO | 2009028667 A1 | 3/2009 |

OTHER PUBLICATIONS

State Intellectual Property Office of the People's Republic of China, First Office Action and Search Report, Application No. 2012800504515, Mar. 13, 2015, 11 pages.

* cited by examiner

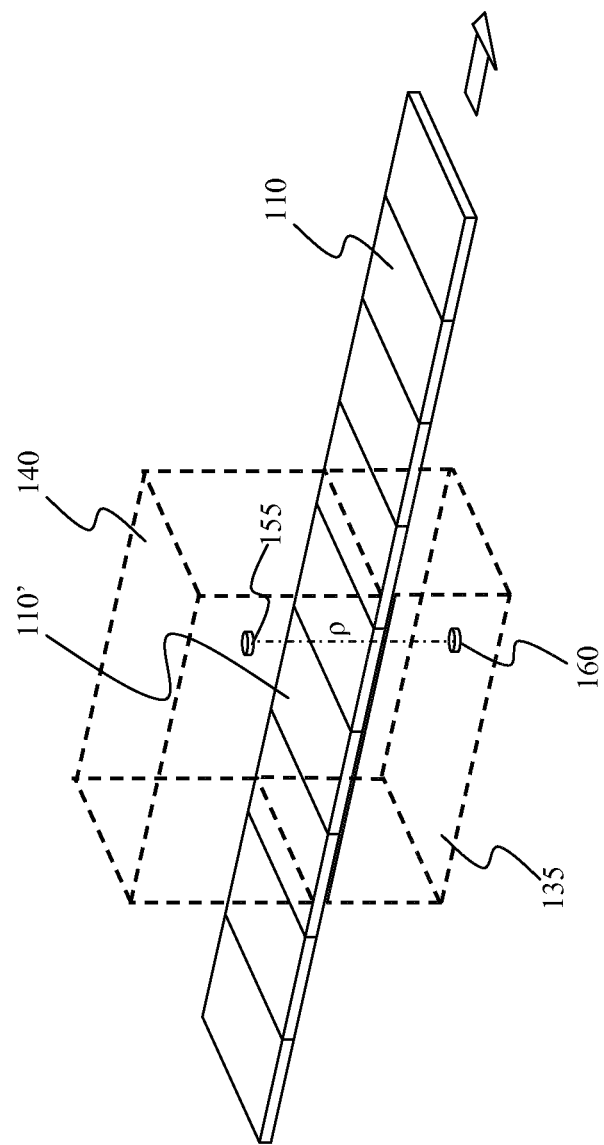
FIG.2A
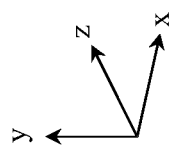

MONITORING SYSTEM FOR TRANSPORT CHAINS FOR CONVEYORS OF ARTICLES

CROSS-REFERENCE TO RELATED APPLICATIONS

This application represents the national stage entry of PCT International Application No. PCT/EP2012/065761 on filed on Aug. 10, 2012 and claims the benefit of Italian Patent Application No. MI2011A001537 filed Aug. 12, 2011. The contents of both of these applications are hereby incorporated by reference as if set forth in their entirety herein.

The present invention generally relates to the field of the conveyors of articles; more specifically the invention relates to a monitoring system for measuring the reduction in thickness due to the wear of the transport chains of these conveyors.

Conveyor of articles, and particularly belt, carpet or chain conveyors, are used in various industrial and civil sectors, from food industry to airports.

In very general terms, a conveyor comprises one or more conveying elements, adapted to provide a support surface for the products to be transported, which are made to advance along a transport path by means of suitable moving means such as electric motors, pinions and dragging toothed wheels.

Particularly, carpet or chain conveyors use as transport means a chain consisting of several segments formed by a plurality of links, hinged together by means of respective pins to form a substantially flat, smooth support surface, destined to support the articles to be carried.

Like all mechanical systems, transporters and their components as well are subjected to wear during their operation. For example, the links forming the segments of the chain may wear due to friction which establishes between the links and the sprockets and/or the support elements, and because of the transported articles themselves, especially if provided with non-negligible weight. Consequently, with the passage of time, the links tend to thin, becoming more fragile. If the thickness of the link excessively decreases, the probability that one of the links may break during operation of the conveyor becomes very high. The reduction of the thickness of the links may also occur in a non-uniform manner, thereby altering the planarity of the support surface of the chain up to the point of no longer being able to ensure the carrying capacity required to transport the articles in an efficient manner.

For this reason, conveyors in principle should need continuous inspections by qualified professionals in order to check the actual size of the reduction of the link thickness and, where necessary, carry out reparation or replacement thereof.

However, a systematic manual monitoring would be prohibitively expensive.

The Applicant has tackled the problem of monitoring the wear thin of the conveyors chains in an at least partially automated way.

An aspect of the present invention relates to a monitoring system for a conveyor of articles. The conveyor of articles comprises at least one transport chain adapted to be moved along a movement direction when the conveyor of articles is in operation, and a guide structure of the transport chain comprising a lower guide element adapted to support the chain from below and a higher guide element adapted to insist on the chain from above and facing toward the lower guide element. Said lower guide element and said higher guide element are static with respect to the movement of the transport chain along the movement direction. The system comprises at least one first magnetic field generator element generating a first magnetic field; the first magnetic field generator element is located in a first selected guide element between said higher guide element and said lower guide element. The system further comprises at least one magnetic field sensor located in a second selected guide element between said higher guide element and said lower guide element different from the first selected guide element for sensing the magnitude of a measure magnetic field; said measure magnetic field ensues at least in part from the first magnetic field. The system further comprises processing means for quantifying a reduction of the overall thickness of the chain further to the operation of the conveyor based on a time variation of the measure magnetic field.

A further aspect of the present invention relates to a conveyor of articles.

The invention preferably refers to a monitoring system for a conveyor of articles, said conveyor of articles comprising at least one transport chain adapted to be moved along a movement direction when the conveyor of articles is in operation, and a guide structure for the transport chain comprising a lower guide element adapted to support the chain from below and a higher guide element adapted to insist on the chain from above and facing toward the lower guide element, said lower guide element and said higher guide element being static with respect to the movement of the transport chain along the movement direction, said monitoring system comprising: at least one first magnetic field generator element generating a first magnetic field, said first magnetic field generator element being located in a first selected guide element selected from said higher guide element and said lower guide element; at least one magnetic field sensor located in a second selected guide element selected from said higher guide element and said lower guide element being different from the first selected guide element for sensing the magnitude of a measure magnetic field, said measure magnetic field ensuing at least in part from the first magnetic field, and processing means for quantifying a reduction of the overall thickness of the chain further to the operation of the conveyor based on a time variation of the measure magnetic field.

In a preferred embodiment said system further comprises at least one second magnetic field generator element located or locatable in the transport chain for generating a second magnetic field, said measure magnetic field further depending on the second magnetic field, and wherein: said processing means are configured to quantify a wear of a side of the chain faced toward the second selected guide element further to the operation of the conveyor based on the time variation of the measure magnetic field.

In a preferred embodiment the transport chain comprises a plurality of chain links, each chain link having a link thickness along a first direction substantially perpendicular to the movement direction, said second magnetic field generator element being located within a reference link of said chain links at a first depth along said first direction, said reduction of the overall thickness of the chain and said wear of a side of the chain corresponding to a reduction of the link thickness further to the operation of the conveyor.

In a preferred embodiment said higher guide element is free to move along the first direction under the action of the force exerted by its weight.

In a preferred embodiment the system is further comprising means for determining a background value of the measure magnetic field, and means for determining a peak value of the measure magnetic field when the reference link transits in proximity to the at least one sensor, wherein said processing means are configured to determine said reduction of the overall thickness of the chain based on a time variation of said background value of the measure magnetic field; determine said wear of a side of the chain based on a time variation of said peak value of the measure magnetic field.

In a preferred embodiment said at least one sensor is a hall sensor.

In a preferred embodiment said first magnetic field generator element is a magnet.

In a preferred embodiment said second magnetic field generator element is a magnet.

The invention also refers to a conveyor of articles comprising a monitoring system according to any one among the preceding claims.

In a preferred embodiment the conveyor is comprising at least one transport chain adapted to be moved along a movement direction when the conveyor of articles is in operation, and a guide structure for the transport chain comprising a lower guide element adapted to support the chain from below and a higher guide element adapted to insist on the chain from above and facing toward the lower guide element, said lower guide element and said higher guide element being static with respect to the movement of the transport chain along the movement direction.

The invention also refers to a method for monitoring a conveyor of articles, said conveyor of articles comprising at least one transport chain adapted to be moved along a movement direction when the conveyor of articles is in operation, and a guide structure of the transport chain comprising a lower guide element adapted to support the chain from below and a higher guide element adapted to insist on the chain from above and facing toward the lower guide element, said lower guide element and said higher guide element being static with respect to the movement of the transport chain along the movement direction, said method comprising providing at least one first magnetic field generator element in a first selected guide element selected from said higher guide element and said lower guide element, said first magnetic field generator element generating a first magnetic field; providing at least one magnetic field sensor in a second selected guide element selected from said higher guide element and said lower guide element different from the first selected guide element; sensing the magnitude of a measure magnetic field by means of the at least one magnetic field sensor element, said measure magnetic field ensuing at least in part from the first magnetic field, and quantifying a reduction of the overall thickness of the chain further to the operation of the conveyor based on a time variation of the measure magnetic field.

A solution in accordance with one or more embodiments of the invention, as well as further features and advantages thereof, will be better understood with reference to the following detailed description, given purely by way of an indicative and non limitative example, to be read in conjunction with the accompanying drawings (in which corresponding elements are indicated with same or similar references and their explanation is not repeated for brevity). In this respect, it is expressly understood that the figures are not necessarily to scale (with some details that may be exaggerated and/or simplified) and that, unless otherwise indicated, they are simply used to conceptually illustrate the described structures and procedures. In particular:

FIG. 1A schematically shows a short section of a conveyor of articles;

FIG. 2A is a simplified view with partially removed parts of the conveyor shown in FIGS. 1A-1D according to an embodiment of the present invention;

Figure 1A:
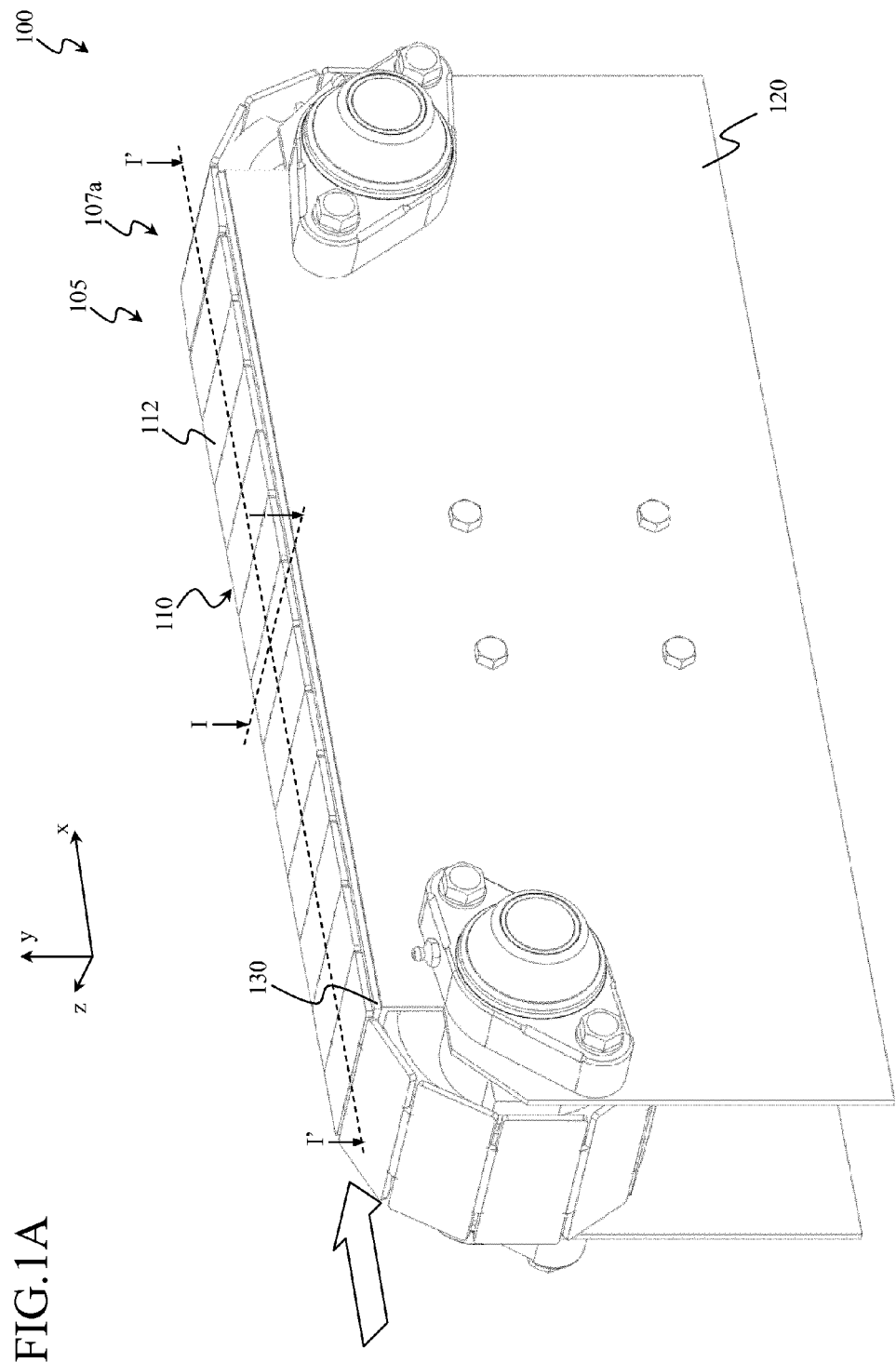
FIG. 1B is a view with partially removed parts of the conveyor of FIG. 1A.
FIG. 1C and FIG. 1D are two sectional views of a portion of the conveyor of FIG. 1A and FIG. 1B.
Figure 1B:
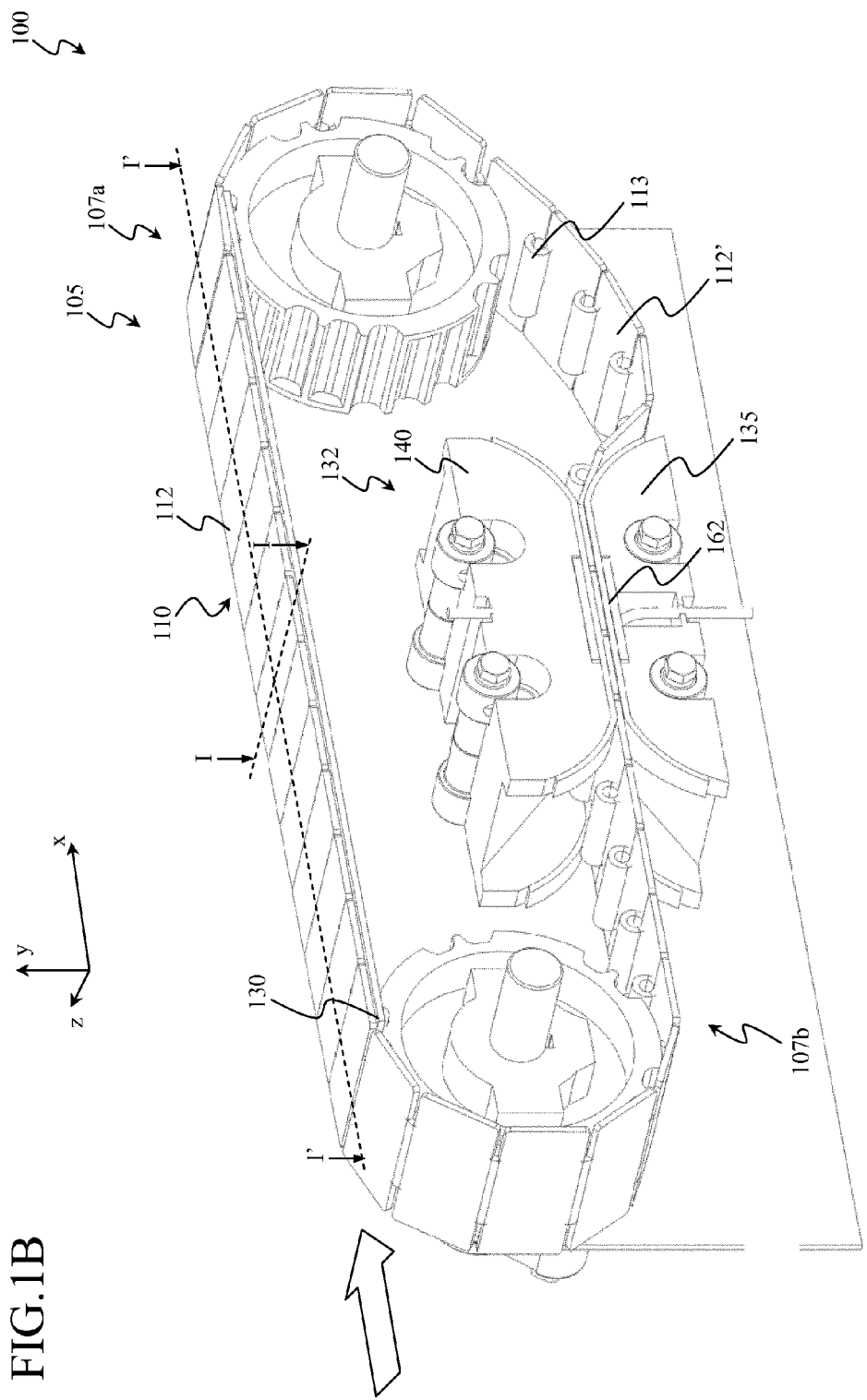
Figure 1C:
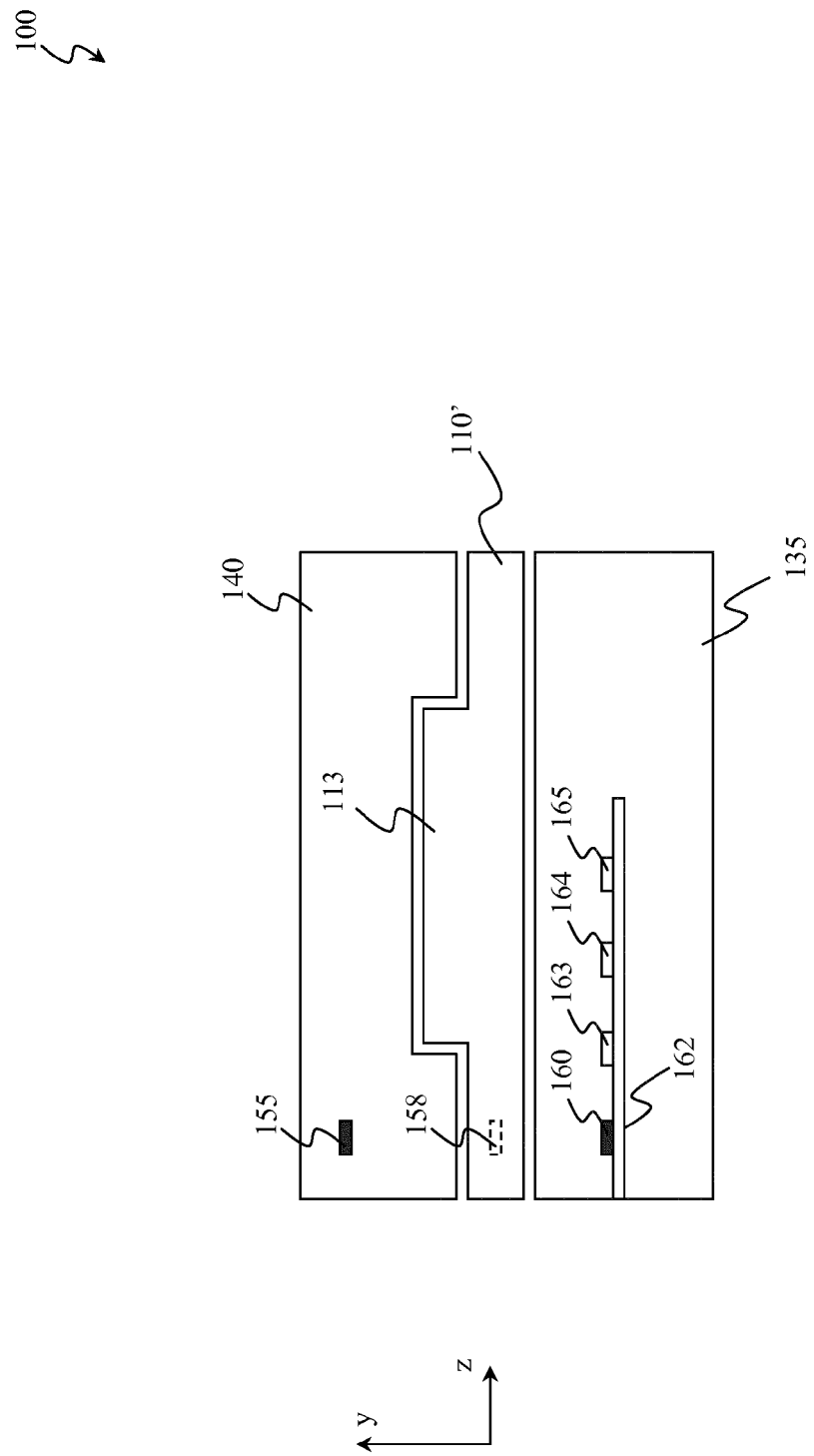
Figure 1D:
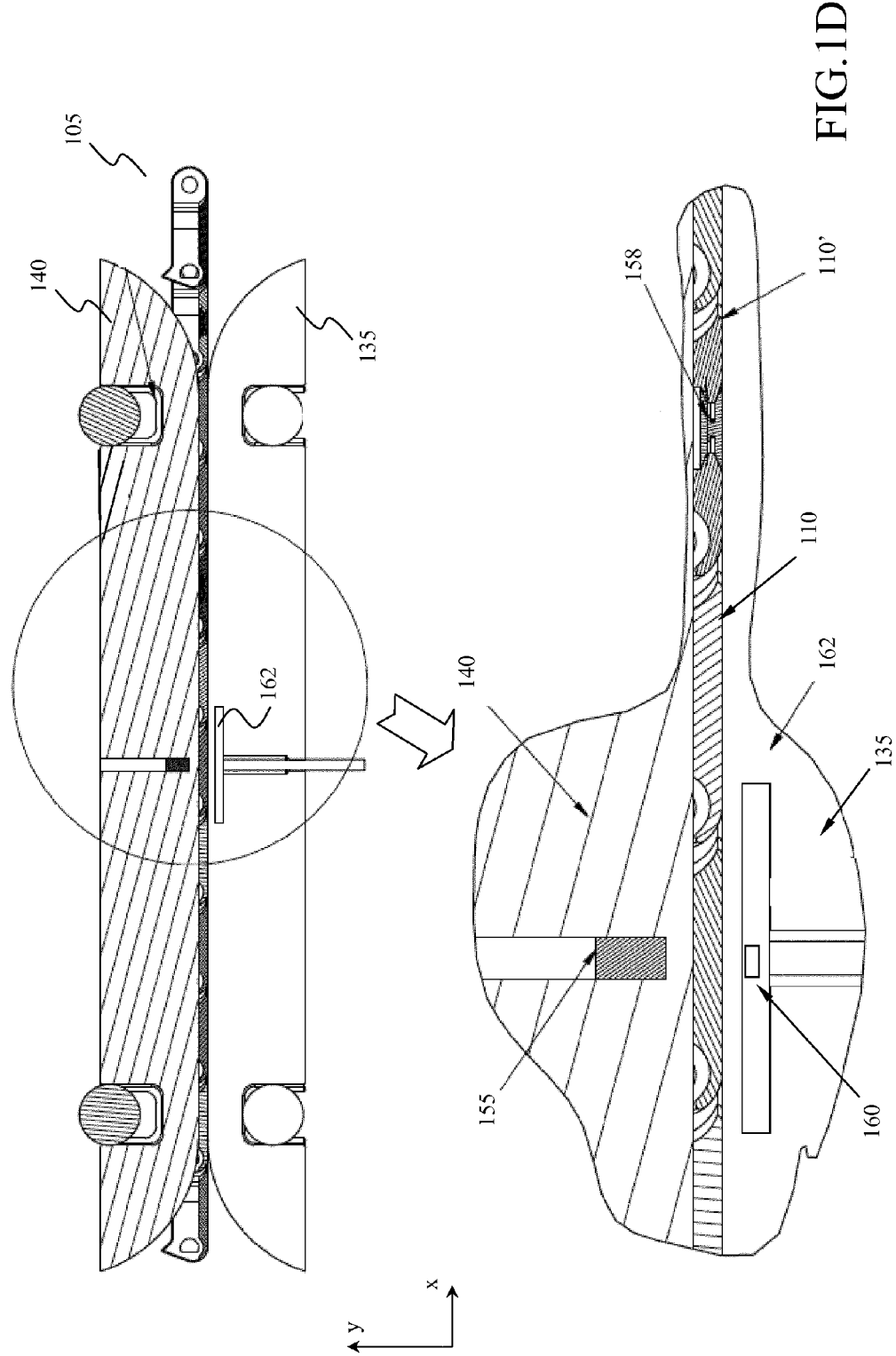
Figure 2B:
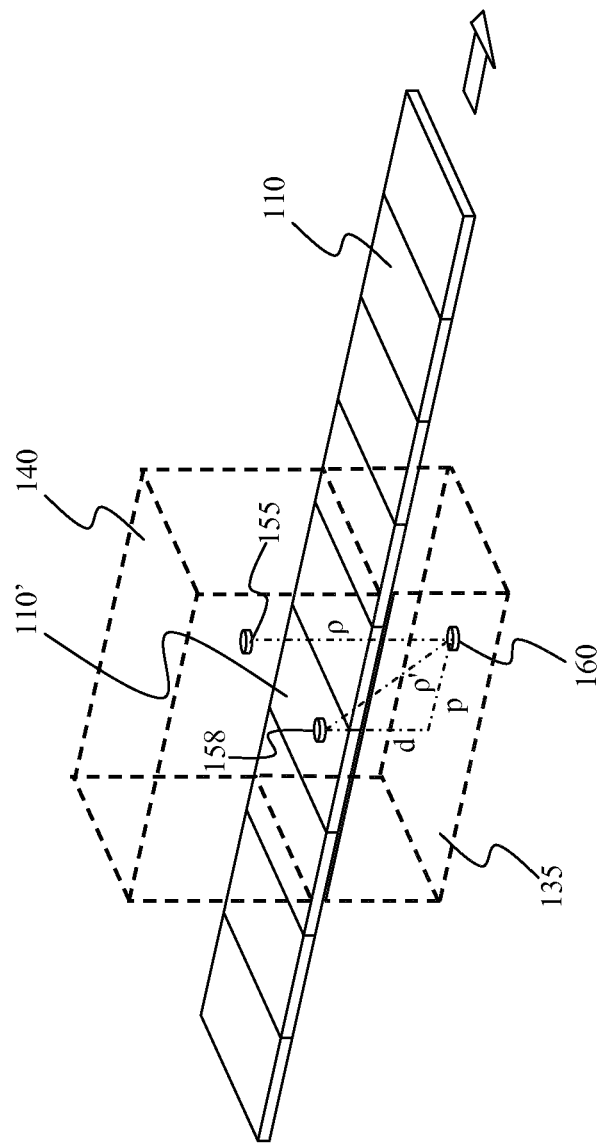
FIG. 2B is a simplified view with partially removed parts of the conveyor shown in FIGS. 1A-1D according to a further embodiment of the present invention.
Figure 3A:
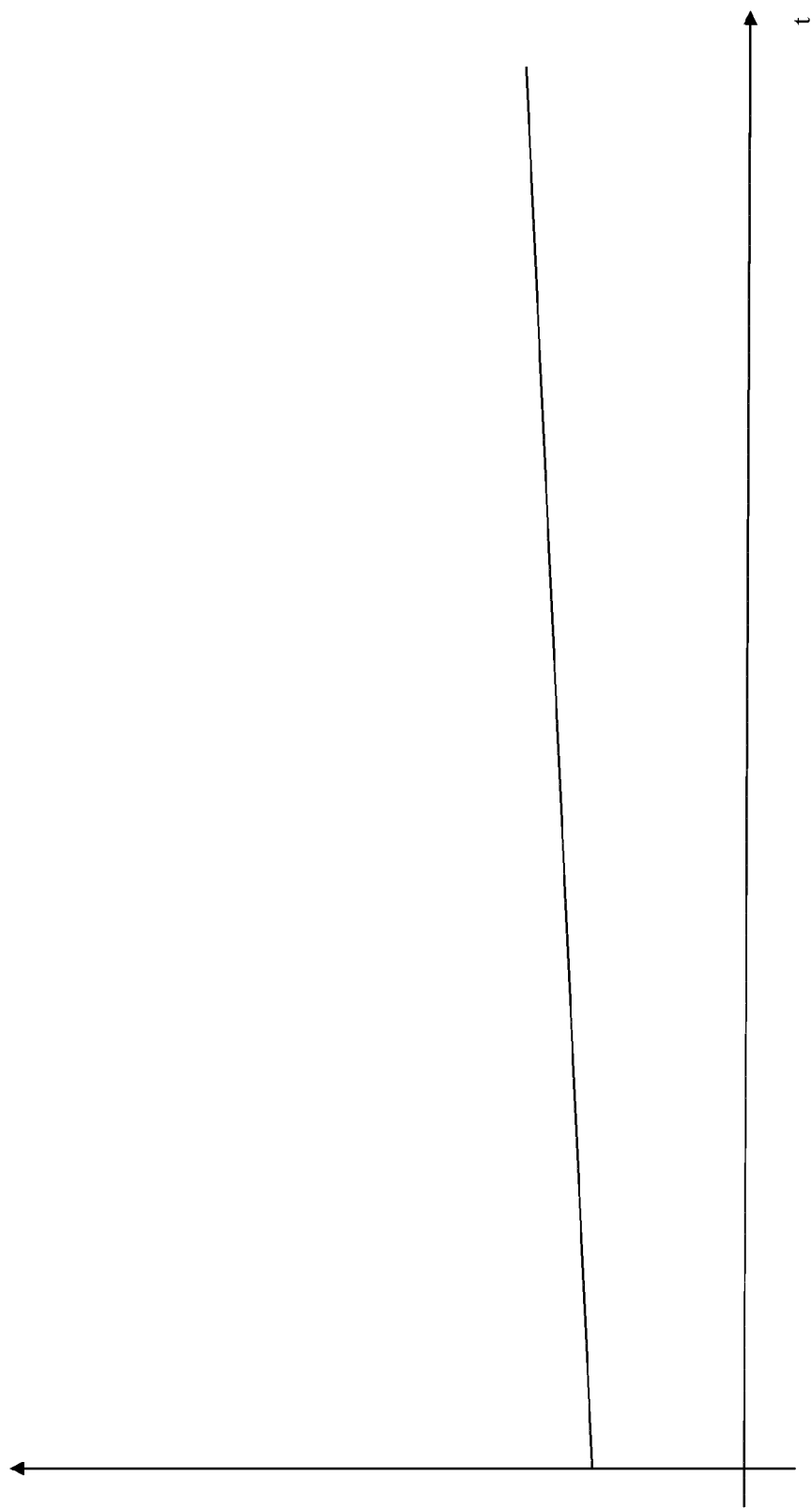
Figure 3B:
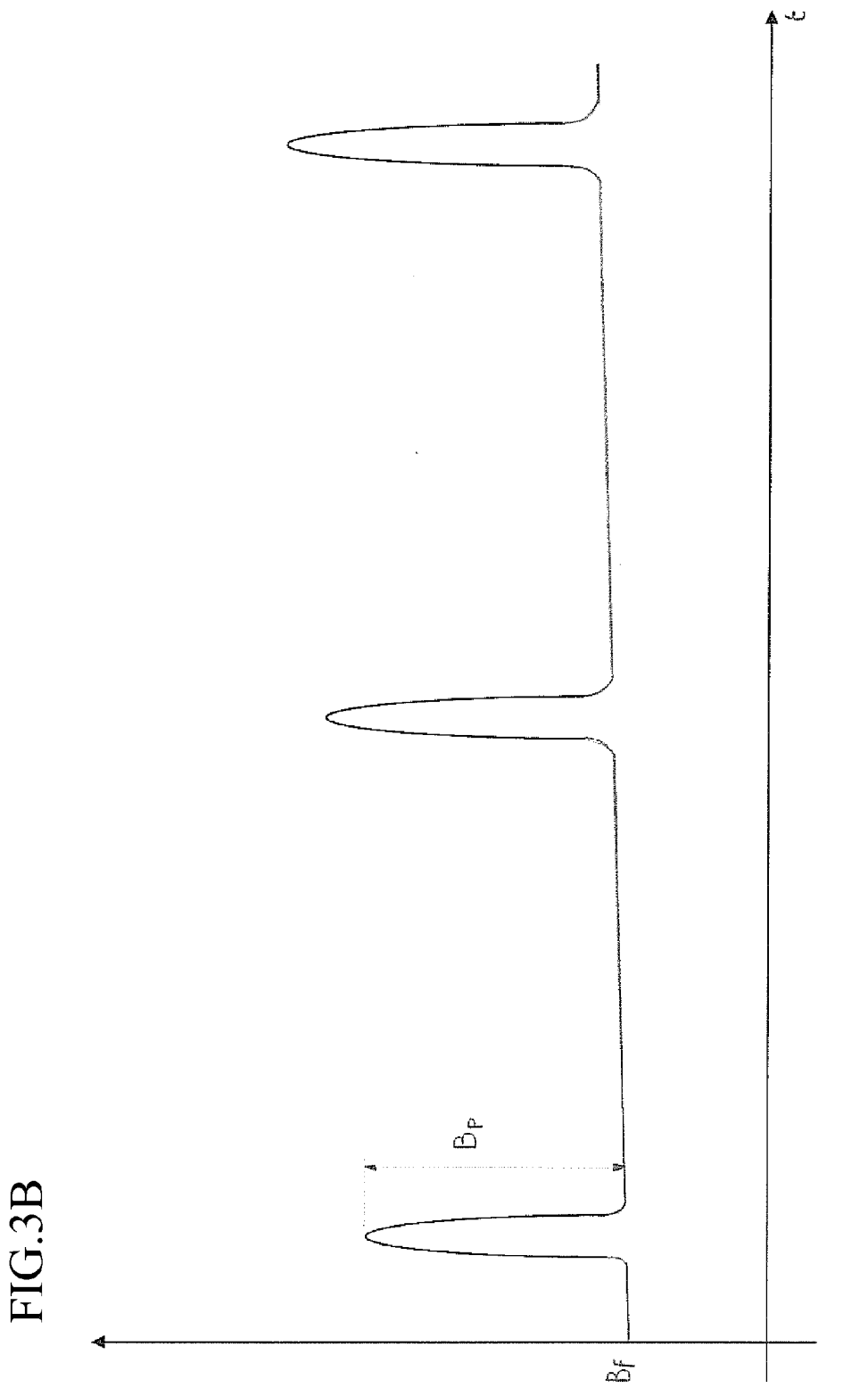

FIG. 3A schematically shows a possible exemplificative evolution in time of the intensity of the magnetic field generated by a magnet of a detector apparatus of the conveyor shown in FIGS. 1A-D and 2A, and FIG. 3B schematically shows a possible exemplificative evolution in time of the intensity of the magnetic field generated by a pair of magnets of a detector apparatus of the conveyor shown in FIGS. 1A-D and 2B.

Referring in particular to the figures, in FIG. 1A it is schematically represented a short section of a conveyor of articles 100, particularly a chain conveyor, comprising for example a transport chain 105 for the transport of articles such as, for example, bottles of beverages (mineral water, soft drinks and the like), not shown in figure. It is stressed that the conveyor type, and the nature of articles that are intended to be transported thereby, are not limitative for the purposes of the present invention, which generally applies to any type of conveyor, irrespective of the nature of the articles to be transported. FIG. 1B is a view with partially removed parts of the conveyor 100. FIG. 1C is a sectional view along line I-I of FIG. 1A and FIG. 1B of the conveyor 100, while FIG. 1D is a sectional view along axis I'-I' of FIG. 1A and FIG. 1B of the conveyor 100.

The chain 105 may be constituted, in general, by a plurality of chain sections, each of which is in turn constituted by a plurality of chain links 110 hinged to one another by means of pins (not shown). Each link 110 comprises a substantially flat first face 112 adapted to support the products to be transported and a second face 112' opposite to the first face. In the embodiment illustrated in the figures, the second face 112' is centrally provided with a coupling protruding element 113 adapted to accommodate the pin (not shown) for the coupling with the adjacent link. The chain 105 forms a closed loop comprising a forward portion 107a, in which the first faces 112 of the links 110 are facing upwards so as to define a substantially flat, smooth surface for supporting products to be transported, and a return portion 107b located in an underlying portion of the conveyor, in which the first faces 112 of the links 110 are facing downward.

The chain 105 is driven in motion by suitable handling means, such as a sprocket-return idle wheel pair, and in use it is supposed to slide along the direction of the arrow shown in the figure. The chain 105 is supported by a support structure 120, which also acts as a cover. Specifically, the forward portion 107a of the chain 105 slidingly rests, at its outer edges, on respective lateral guide profiles 130 made in a material having a low friction coefficient, mounted on shoulders of the support structure 120. The return portion 107b of the chain 105 is located within the support structure 120, for passing within a guide structure 132. Specifically, the guide structure 132 comprises a lower guide element 135 adapted to support the return portion 107b of the chain 105 from below and an upper guide element 140 apt to insist on the return portion 107b of the chain 105 from above. The lower guide element 135 and the upper guide element 140 have a corresponding guide profile made in a material with a low friction coefficient. In order to allow the sliding of the chain links 110 within the guide structure, the guide profile of the lower guide element 135 has a bottom surface matching the first face 112 of the generic link, while the guide profile of the upper guide element 140 has a surface matching the second face 112' of the generic link, comprising a recess shaped so as to allow the passage of the protruding coupling elements 113. While the lower guide member 135 is bound to the support structure 120, the upper guide member 140 is free to move vertically (along the direction y shown in the figure) under the action of the force exerted by its own weight, guaranteeing the adhesion to the second face 112' of the link 110 and at the same time the adhesion of the first face 112 of the links 110 to the lower guide element 135 during operation.

In general terms, the solution according to an embodiment of the present invention provides that each chain to be monitored is associated with at least one detector apparatus comprising at least one sensor adapted to measure the intensity of the magnetic field generated by at least one generating element located in the upper guide element. The intensity of the magnetic field measured at a point in space is a function of the distance between the measuring point and the source of the magnetic field itself. Since a variation of the thickness of the link in which the magnetic field generator element is located translates into a variation of the actual distance between the sensor and such magnetic field generator element, through the measurement of the evolution in time of the intensity variations of the detected magnetic field, the detector apparatus is able to determine the evolution in time of the reduction of the overall thickness of the chain.

In accordance with a preferred embodiment of the present invention, the sensor is or comprises an analog Hall sensor.

In particular, according to an embodiment of the present invention, the detector apparatus of the chain 105 includes a magnet 155 located in a portion of the upper guide element 140 and a Hall sensor 160 located in a portion of the lower guide element 135 just below the return portion 107b of the chain 105. The magnet 155 is preferably positioned in the upper guide element 140 so as to be exactly above the position of the Hall sensor element 160 in the lower guide element 135.

Without going into details well known to experts in the field, an analog Hall sensor is an electronic device that allows the measurement of the intensity of the magnetic field exploiting the Hall effect. According to this embodiment, the Hall sensor 160 is installed on a printed circuit board 162 located in the lower guide element 135.

A simplified view with partially removed parts of the conveyor 100 of the previous figures in which detector apparatus of the chain 105 is visible according to an embodiment of the present invention is schematically illustrated in FIG. 2A.

As previously mentioned, in the exemplary embodiment here considered and described, the magnet 155 and the sensor 160 are always aligned along the direction y shown in the figures.

Accordingly, referring to FIG. 2A, the actual distance $\rho$ between the magnet 155 and the sensor 160 has only a component along the direction y.

The sensor 160 detects the intensity of the magnetic field B1 generated by the magnet 155. In general, since the intensity of the magnetic field generated by a magnet detected by a sensor depends on the inverse of the cube of the actual distance between the magnet and the sensor, the intensity of the magnetic field B1 detected by the sensor 160 depends on the inverse of the cube of the actual distance $\rho$ between the magnet 155 and the sensor 160.

Taking advantage of the above-mentioned relationship between the magnetic field intensity and the distance between source and sensor, by measuring in time (through the sensor 160) the intensity of the magnetic field B1 it is therefore possible to obtain an estimate of the time course of the distance $\rho$ between sensor 160 and magnet 155 along the direction y.

A possible exemplificative evolution in time of the intensity of the magnetic field B1 detected by the sensor 160 is illustrated in a simplified manner in FIG. 3A.

Referring jointly to FIGS. 1A-1D, 2A and 3A, the distance $\rho$ between the sensor 160 and the magnet 155 along the direction y, with the passage of time tends to decrease due to the overall thinning of the link 110 of the chain 105—where this thinning is caused by the friction that establishes between the link and the support elements, and because of the transported articles—, since the upper guide member 140 in which the magnet 155 is situated is free to move along the direction y under the action of the force exerted by its own weight. Accordingly, by observing the evolution in time of the distance $\rho$ carried out by measuring the evolution in time of the magnetic field B1 via the sensor 160 is possible to monitor the reduction of overall thickness of the chain 105.

Referring to the example shown in FIG. 3, it can be noted in fact that with the passing of time the intensity of the magnetic field B1 detected by the sensor 160 tends to increase. Note that in the considered example the variation in time of the intensity of the magnetic field B1 has been greatly exaggerated for purposes of clarity, since in reality a reduction in thickness of the chain 105 (and, therefore, a reduction of the distance $\rho$) sufficient to cause an effective increase in the intensity of the magnetic field B1 detected by the sensor 160 may usually occur only after a long period of use, e.g., of the order of months.

In accordance with an embodiment of the present invention, the board 162 includes a processing unit 165 for receiving from the sensor 160 an electrical signal proportional to the intensity of the detected magnetic field B1 and calculating, on the basis of this signal, the effective overall thickness reduction of the links 110. In accordance with an embodiment of the present invention, the processing unit 165 is located in a remote position with respect to the conveyor 100. For example, the detector apparatuses of a plurality of conveyors 100 localized in the same plant can be coupled to a single control unit—for example through a respective field bus—for the collection of the signals generated by the sensors 160 of the conveyor 100. In this case, a single partial data processing or storage unit 165 may be provided in the control unit. In the case in which the reduction of the overall thickness calculated by the processing unit 165 exceeds a predefined corresponding threshold, the controller may be configured to communicate to an operator that it is time to replace the worn chain. Such communication can for example be effected by means of an acoustic and/or visual signaling and/or through the transmission of an appropriate alarm signal, for example, carried out through a modem equipped on the control unit itself and adapted to transmit data on an external network, such as a MAN, a WAN, a VPN, Internet, or a telephone network.

In accordance with a further embodiment of the present invention, the detector apparatus of the chain 105 comprises a further magnet 158 embedded in a reference link 110' of the chain, or otherwise made integral with it, in such a way that the magnet 158, during the movement of chain 105, transits above the sensor 160.

A simplified view with partially removed parts of the conveyor 100 of the previous figures in which the detector apparatus of the chain 105 is visible in accordance with this further embodiment of the present invention is schematically illustrated in FIG. 2B.

As can be seen, the magnet 158 and the sensor 160 are substantially aligned along the direction x indicated in the figures.

Accordingly, referring to FIG. 2B, while the actual distance ρ between the magnet 155 and the sensor 160 has only a component along the direction y, the effective distance ρ' between the magnet 158 and the sensor 160 during the generic instant of time of operation of the conveyor 100 may be decomposed into a first distance d along the direction y and in a second distance p along the direction x depending on the position assumed by the chain 105 to such an instant of time—the distance p is therefore equal to 0 only in the instant of time in which the position of the chain 105 is such as to bring the magnet 158 to be exactly above the sensor 160.

According to this embodiment of the invention, the sensor 160 detects the intensity of the magnetic field from the resulting overall magnetic field B1 generated by the magnet 155 and by the magnetic field B2 generated by the magnet 158. The intensity of the overall magnetic field B detected by the sensor 160 depends on both the inverse of the cube of the effective distance ρ between the magnet 155 and the sensor 160, and on the inverse of the cube of the effective distance ρ' between the magnet 158 and the sensor 160.

Neglecting for the moment the presence of the magnet 155, and considering the contribution of the magnet 158 only (in this case, B=B2) it can be observed that the intensity of the magnetic field B detected by the sensor 160 has a pulsed trend over time, dependent on the position gradually assumed by the chain 105.

Particularly, when the position of the reference link 110' is such that the sensor 158 is substantially distant from the sensor 160, i.e., when the distance p has a sensibly high value, the intensity of the magnetic field B2 detected by the sensor 160 is substantially null. Following the movement of the chain 105, the reference link 110' approaches the position of the sensor 160, and the distance p decreases to the point that the sensor 160 detects an intensity of the magnetic field B2 different than zero. As the distance p decreases, the intensity of the detected magnetic field B2 increases. When the movement of the chain 105 is such that the magnet 158 is above the sensor 160, the intensity of magnetic field B2 detected by the sensor 160 reaches a peak value $B2_{peak}$; in this condition, the magnet 158 is at the minimum distance $ρ'_{min}$ from the sensor 160, since p=0. At this point, with the movement of the chain 105, the magnet 158 moves away, the distance p increases again, and the intensity of magnetic field B2 detected by the sensor 160 decreases, up to become again substantially zero when the distance p assumes a sufficiently high value. The intensity of magnetic field B2 detected by the sensor 160 will still be different from zero when the movement of the chain 105 will be such that the link reference 110' returns to be sufficiently close to the sensor 160. Consequently, the time course of the intensity of the magnetic field B2 detected by the sensor 160 corresponds to a succession of peaks, each having a corresponding peak height $B2_{peak}$. Taking advantage of the relation between the intensity of magnetic field and the distance between source and sensor, by measuring over time the peak heights $B2_{peak}$ (via the sensor 160) is therefore possible to obtain an estimate of the time course of the distance d between sensor 160 and magnet 158 along the direction y.

In presence of both the magnet 155 and the magnet 158, the intensity of the overall magnetic field B detected by the sensor 160 may be approximated as a superposition of the intensity of the magnetic field B1 generated by the magnet 155 in absence of the magnet 158 with the intensity of the magnetic field B2 generated by the magnet 158 in absence of the magnet 155. A possible exemplificative time course of the overall magnetic field B intensity detected by the sensor in presence of both the magnet 155 and the magnet 158 is illustrated in a simplified manner in FIG. 3B.

As can be seen in figure, the time course of the intensity of the magnetic field B provides for a succession of peaks which rise from a background value Bf different than zero. The heights of these peaks with respect to the background value Bf—identified with the reference Bp—correspond to the peak heights $B2_{peak}$ of the magnetic field B2, while the background value Bf corresponds to the intensity of the magnetic field B1.

Since the distance ρ between the sensor 160 and the magnet 155 determines the intensity of the magnetic field B1, which in turn determines the background value Bf of the magnetic field B intensity, accordance to an embodiment of the present invention the observation of the evolution in time of the distance ρ is obtained by measuring over time the background value Bf. Referring to the example shown in FIG. 3B, it can be noted in fact that with the passing of time the background value Bf tends to grow. As in the example shown in FIG. 3A, in the considered example the variation in time of the background value Bf has been strongly exaggerated for clarity purposes.

According to an embodiment of the present invention, the sensor 160, adapted to provide a detection electrical signal substantially proportional to the (instantaneous) intensity of the detected magnetic field B, is coupled to a background value measuring circuit 163. For example, the background value measuring circuit 163 can be configured to estimate the background value Bf calculating the mean value Sm of the intensity of the detection signal generated by the sensor in a time interval corresponding to a reduced number of complete revolutions of the chain 105; indeed, since in the course in time of the magnetic field B peaks occur with a very low duty cycle—once for each complete revolution of the chain 105—, this average value Sm will have a value which will substantially correspond to the background value Bf.

The distance d between the sensor 160 and the magnet 158 along the direction y, with the passage of time tends to decrease due to the thinning of the links 110 of the chain 105. Unlike the distance ρ, which is affected by any type of reductions in thickness of the links 110 of the chain 105, since the magnet 155 is located externally to the link 110, the distance d is only influenced by reductions in thickness between the first face 112 of the reference link 110' and the portion of such link in which the magnet 158 itself is situated. Any reduction in thickness of the link reference 110' between the second face 112' and the portion in which the magnet 158 is situated does not affect the distance d in any way.

From now on, the reductions of thickness between the second face 112' of a generic link 110 and the portion of the link itself corresponding to the portion of the reference link 110' wherein the magnet 158 is located will be identified as "rear thickness reductions", while the reductions of the thickness between the first face 112 of a generic link and the portion of the link itself corresponding to the portion of the reference link 110' in which the magnet 158 is located will be identified as "front thickness reductions".

Since the entity of the thinning of the chain 105 reflects on the thinning of the reference link 110' by the same extent, by means of observation of the evolution in time of the distance d it is possible to monitor the front thickness reductions which the links 110 of the chain 105 are subjected to as a whole.

Since the distance d determines the peak heights $B2_{peak}$ of the magnetic field B2, which in turn determine the heights of the peaks Bp of the intensity of the magnetic field B, according to an embodiment of the present invention the observation of the evolution in time of the distance d is obtained by measuring over time the peak heights Bp. Referring to the example shown in FIG. 3B, it can be noted in fact that with the passage of time the peak heights Bp tend to increase. Also in this case the variation in time of the peak heights Bp has been strongly exaggerated for purposes of clarity, since in reality a rear thickness reduction of the links 110 of the chain 105 (and, therefore, a reduction of the distance d) sufficient to cause an actual increase in peak heights Bp may usually occur only after a long period of use, e.g., of the order of months.

In accordance with an embodiment of the present invention, the sensor 160 is further coupled to a suitable peak detector circuit 164 (for example, installed on the printed circuit board 162), preferably an analog peak detector, adapted to determine, for each passage of the magnet 158, the peak value Sp assumed by the detection signal, and to calculate a corresponding peak height Bp. For example, an esteem of the peak height Bp can be calculated by subtracting from the peak value Sp of the detection signal the last calculated average value Sm.

In accordance with an embodiment of the present invention, the processing unit 165 is adapted to calculate, on the basis of the average value Sm received from the background value measuring circuit 163, the effective reduction of the overall thickness of the link 110, and to calculate, on the basis of the peak value Sp received from the peak detector circuit 164, the effective front thickness reduction of the link 110. According to an embodiment of the present invention, the processing unit 165 is also configured to calculate the effective rear thickness reduction of the links 110 from the just calculated overall thickness reduction and rear thickness reduction.

The embodiment just described allows to monitor the rear thickness reduction of the links in an indirect manner starting from the overall thickness reduction and from the front thickness reduction. Similar considerations may apply in case it is desired to directly monitor the rear thickness reduction instead of the front one, provided to exchange the position of the magnet 155 with the position of the sensor 160.

Naturally, to the solution described above, a skilled in the art, in order to satisfy contingent and specific requirements, may make numerous modifications and variations.

For example, although in the description reference is made to a sensor located in the lower portion of the conveyor, and particularly within the guide structure of the return portion of the chain, the concepts of the present invention may also be applied in cases where the sensor is located in different areas, both in the vicinity of the return portion and in the vicinity of the forward portion of the chain.

The invention claimed is:

1. A monitoring system for a conveyor of articles, said conveyor of articles including at least one transport chain adapted to be moved along a movement direction when the conveyor of articles is in operation, and a guide structure for the transport chain including a lower guide element adapted to support the chain from below and a higher guide element adapted to guide the chain from above and facing toward the lower guide element, said lower guide element and said higher guide element being static with respect to the movement of the transport chain along the movement direction, said monitoring system comprising:
at least one first magnetic field generator element generating a first magnetic field, said first magnetic field generator element being located in a first selected guide element selected from said higher guide element and said lower guide element;
at least one magnetic field sensor located in a second selected guide element selected from said higher guide element and said lower guide element being different from the first selected guide element for sensing the magnitude of a measure magnetic field, said measure magnetic field ensuing at least in part from the first magnetic field, and
a processing unit for quantifying a reduction of the overall thickness of the chain further to the operation of the conveyor based on a time variation of the measure magnetic field.

2. The system of claim 1, wherein:
said system further comprises at least one second magnetic field generator element located or locatable in the transport chain for generating a second magnetic field, said measure magnetic field further depending on the second magnetic field, and wherein:
said processing unit is configured to quantify a wear of a side of the chain faced toward the second selected guide element further to the operation of the conveyor based on the time variation of the measure magnetic field.

3. The system of claim 2, wherein the transport chain includes a plurality of chain links, each chain link having a link thickness along a first direction substantially perpendicular to the movement direction, said second magnetic field generator element being located within a reference link of said chain links at a first depth along said first direction, said reduction of the overall thickness of the chain and said wear of a side of the chain corresponding to a reduction of the link thickness further to the operation of the conveyor.

4. The system of claim 1, wherein said higher guide element is free to move along the first direction under action of a force exerted by its weight.

5. The system of claim 2, further comprising:
a background measuring circuit determining a background value of the measure magnetic field, and
a peak detector circuit determining a peak value of the measure magnetic field when the reference link transits in proximity to the at least one sensor, wherein:
said processing unit configured to:
determine said reduction of the overall thickness of the chain based on a time variation of said background value of the measure magnetic field;
determine said wear of a side of the chain based on a time variation of said peak value of the measure magnetic field.

6. The system of claim 1, wherein said at least one sensor is a Hall sensor.

7. The system claim 1, wherein said first magnetic field generator element is a magnet.

8. The system of claim 2, wherein said second magnetic field generator element is a magnet.

9. A conveyor of articles comprising a monitoring system according to claim 1.

10. The conveyor of claim 9, comprising at least one transport chain adapted to be moved along a movement direction when the conveyor of articles is in operation, and a guide structure for the transport chain including a lower guide element adapted to support the chain from below and a higher guide element adapted to guide the chain from above and facing toward the lower guide element, said lower guide element and said higher guide element being static with respect to the movement of the transport chain along the movement direction.

11. A method for monitoring a conveyor of articles, said conveyor of articles including at least one transport chain adapted to be moved along a movement direction when the conveyor of articles is in operation, and a guide structure of the transport chain including a lower guide element adapted to support the chain from below and a higher guide element adapted to guide the chain from above and facing toward the lower guide element, said lower guide element and said higher guide element being static with respect to the movement of the transport chain along the movement direction, said method comprising:
- providing at least one first magnetic field generator element in a first selected guide element selected from said higher guide element and said lower guide element, said first magnetic field generator element generating a first magnetic field;
- providing at least one magnetic field sensor in a second selected guide element selected from said higher guide element and said lower guide element different from the first selected guide element;
- sensing the magnitude of a measure magnetic field by means of the at least one magnetic field sensor element, said measure magnetic field ensuing at least in part from the first magnetic field; and
- quantifying a reduction of the overall thickness of the chain further to the operation of the conveyor based on a time variation of the measure magnetic field.

\* \* \* \* \*